(12) United States Patent
Lee (10) Patent No.: US 12,513,184 B2
(45) Date of Patent: Dec. 30, 2025

(54) APPARATUS AND METHOD FOR PERFORMING THREAT ANALYSIS AND RISK ASSESSMENT FOR VEHICLE CYBERSECURITY

(71) Applicants: HYUNDAI MOTOR COMPANY, Seoul (KR); KIA CORPORATION, Seoul (KR)

(72) Inventor: Kwon Hyeong Lee, Ansan-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 35 days.

(21) Appl. No.: 18/769,044

(22) Filed: Jul. 10, 2024

(65) Prior Publication Data
US 2025/0193229 A1    Jun. 12, 2025

(30) Foreign Application Priority Data
Dec. 6, 2023 (KR) .................. 10-2023-0176010

(51) Int. Cl.
*H04L 9/40* (2022.01)
(52) U.S. Cl.
CPC ...... *H04L 63/1441* (2013.01); *H04L 63/1433* (2013.01); *H04L 2463/146* (2013.01)
(58) Field of Classification Search
CPC .............. H04L 63/1441; H04L 63/1433
USPC .................................................... 726/23
See application file for complete search history.

(56) References Cited

U.S. PATENT DOCUMENTS

| | | | | |
|---|---|---|---|---|
| 8,464,346 | B2* | 6/2013 | Barai | H04L 63/1433 705/18 |
| 10,142,365 | B2* | 11/2018 | Grubel | H04L 63/1433 |
| 2010/0138925 | A1* | 6/2010 | Barai | H04L 63/1433 726/25 |
| 2018/0316698 | A1* | 11/2018 | David | H04L 63/0236 |
| 2019/0297100 | A1* | 9/2019 | David | G06F 21/51 |
| 2024/0070291 | A1 | 2/2024 | Lee | |

FOREIGN PATENT DOCUMENTS

KR        20240028233 A      3/2024

OTHER PUBLICATIONS

Kwon Hyeong Lee et al., Method of vehicle controller cybersecurity threat analysis and risk assessment, Korean Society of Automotive Engineers Spring Conference 2023, 26 pp.

\* cited by examiner

*Primary Examiner* — Teshome Hailu
(74) *Attorney, Agent, or Firm* — Lempia Summerfield Katz LLC (57) ABSTRACT

An apparatus for performing threat analysis and risk assessment (TARA) includes an input device configured to receive an input of a user. The apparatus also includes a processor configured to generate a threat scenario based on information about a specific damage scenario, when a specific damage scenario requiring threat analysis is selected through the input device. The processor is also configured to determine information about an attack path depending on the technical services based on a pre-stored database. The processor is additionally configured to derive a security goal based on the information about the attack path.

18 Claims, 8 Drawing Sheets

APPARATUS AND METHOD FOR PERFORMING THREAT ANALYSIS AND RISK ASSESSMENT FOR VEHICLE CYBERSECURITY

CROSS-REFERENCE TO RELATED APPLICATION

This application claims the benefit of and priority to Korean Patent Application No. 10-2023-0176010, filed on Dec. 6, 2023, the entire contents of which are hereby incorporated herein by reference.

TECHNICAL FIELD

The present disclosure relates to an apparatus and method for performing threat analysis and risk assessment for vehicle cybersecurity and a method for the same.

BACKGROUND

Today, vehicles are evolving into connected cars and autonomous vehicles, and software is changing complexly to control the functions of advanced vehicles. As software complexity increases, vulnerabilities inherent in software increase, and cyber threats such as hacking to the software are also rapidly increasing. Therefore, cybersecurity is becoming a very important factor in vehicle design.

The Vehicle Cybersecurity International Standards (UNR No. 155) adopted by the Conference on Automotive International Standards (WP.29) under the European Economic Commission (UNECE) provides requirements for automakers to comply to ensure vehicle cybersecurity. The requirements are mainly divided into two categories. The first category is for a Cyber Security Management System that must be built at the enterprise level, and the second category is for a vehicle type subject to Type Approval. Automakers should establish a cybersecurity management system to obtain Type Approval and document and submit the results of risk assessment and security testing for each vehicle type to Type Approval Authorities or Technical Services.

ISO/SAE 21434 is a vehicle cybersecurity standard that defines procedures and organizational requirements for achieving strong vehicle cybersecurity. The ISO/SAE 21434 standard presents only minimum requirements for each step when performing TARA Threat Analysis and Risk Assessment (TARA) for the vehicle's function (Headlamp System). Accordingly, there has been required a scheme for threat analysis and risk assessment configured for each control unit (ECU) and applied to the vehicle.

There are numerous controllers, various functions of the controller, and assets according to various functions. There are various damage scenarios depending on the asset, and various threat scenarios. Accordingly, there is a limitation that it takes a lot of time to analyze the attack path depending on the threat scenario and to derive security goals considering the threat for each attack path.

The statements in this section merely provide background information related to the present disclosure and may not constitute prior art.

SUMMARY

The present disclosure has been made to solve the above-mentioned problems occurring in the prior art while advantages achieved by the prior art are maintained intact.

Aspects of the present disclosure provide an apparatus and a method for performing TARA, capable of determining the optimal attack path based on the information about a vehicle and the information about a target controller requiring security, and deriving a security goal corresponding to each threat with respect to each attack path, when deriving the security goal.

Aspects of the present disclosure provide an apparatus and a method for performing TARA, capable of generating a threat scenario based on information about a specific damage scenario, when the specific damage scenario is selected, determining information about an attack path depending on the threat scenario based on a pre-stored database, and deriving a security goal based on the information about the attack path, thereby saving costs and time required to remove the attack path irrelevant to the type of the vehicle and the controller that is a target of the security.

The technical problems to be solved by the present disclosure are not limited to the aforementioned problems. Other technical problems not mentioned herein should be more clearly understood from the following description by those having ordinary skill in the art to which the present disclosure pertains.

According to an aspect of the present disclosure, an apparatus for performing threat analysis and risk assessment (TARA) is provided. The apparatus includes an input device configured to receive an input of a user. The apparatus also includes a processor configured to generate a threat scenario based on information about a specific damage scenario, when a specific damage scenario requiring threat analysis is selected through the input device. The processor is also configured to determine information about an attack path depending on the threat scenario based on a pre-stored database. The apparatus is further configured to derive a security goal based on the information about the attack path.

According to an embodiment, the database may include detailed information about asset types for all damage scenarios, information about an attack surface, information about a target controller that requires security, information about a threat scenario database (DB) for multiple damage scenarios, a threat DB for each attack path DB depending on the threat scenario DB, threat mitigation information DB linked to the threat DB, and an attack feasibility rating DB.

According to an embodiment, the database may include asset-related information including a function, an asset, an asset type, a security property, and a threat type for multiple damage scenarios.

According to an embodiment, the processor may be configured to extract demand information about the threat scenario to determine the attack path.

According to an embodiment, the processor may be configured to extract the demand information including the detailed information about an asset type related to a threat scenario, information about an attack surface, and information about a target controller.

According to an embodiment, the processor may be configured to retrieve the demand information from the database.

According to an embodiment, the processor may extract, from the pre-stored database, a threat for each attack path corresponding to the demand information retrieved from the database. The processor may also be configured to determine the extracted threat for each attack path as a threat for each attack path included in the information about the attack path depending on the threat scenario.

According to an embodiment, the processor may be configured to retrieve, from the pre-stored database, the threat mitigation information linked to a threat corresponding to the demand information retrieved from the pre-stored database. The processor may also be configured to determine the threat mitigation information linked to the retrieved threat, as threat mitigation information linked to a threat included in the information about the attack path depending on the threat scenarios.

According to an embodiment, the processor may be configured to retrieve, from the pre-stored database, the attack feasibility ranking corresponding to the demand information retrieved from the pre-stored database. The processor may also be configured to determine the retrieved attack feasibility ranking as an attack feasibility ranking included in information about the attack path depending on the threat scenarios.

According to an embodiment, the processor may be configured to output the security goal through an output device, when the security goal is derived.

According to an embodiment, a method for performing threat analysis and risk assessment (TARA) is provided. The method includes determining a specific damage scenario requiring threat analysis as being selected, through an input device, by a user. The method also includes generating a threat scenario based on information about the specific damage scenario. The method additionally includes determining information about an attack path depending on the threat scenario based on a pre-stored database. The method further includes deriving a security goal based on information about the attack path.

According to an embodiment, the pre-stored database may include detailed information about asset types for multiple damage scenarios, information about an attack surface, information about a target controller that requires security, information about a threat scenario database (DB) for all damage scenarios, a threat DB for each attack path DB depending on the threat scenario DB, threat mitigation information DB linked to the threat DB, and an attack feasibility rating DB.

According to an embodiment, the pre-stored database may include asset-related information including a function, an asset, an asset type, a security property, and a threat type for the multiple damage scenarios.

According to an embodiment, the method may further include extracting demand information about the threat scenario to determine the attack path.

According to an embodiment, the method may further include extracting demand information including an asset type related to the threat scenario, detailed information of the asset type, a threat type, information about an attack surface, and target controller information.

According to an embodiment, the method may further include retrieving the demand information from the pre-stored database.

According to an embodiment, the method may further include extracting, from the pre-stored database, a threat for each attack path corresponding to the demand information retrieved from the database. The method may additionally include determining the extracted threat for each attack path as a threat for each attack path included in the information about the attack path depending on the threat scenario.

According to an embodiment, the method may further include retrieving, from the pre-stored database, the threat mitigation information linked to a threat corresponding to the demand information retrieved from the database. The method may additionally include determining the threat mitigation information linked to the retrieved threat, as threat mitigation information linked to a threat included in the information about the attack path depending on the threat scenarios.

According to an embodiment, the method may further include retrieving, from the pre-stored database, the attack feasibility ranking corresponding to the demand information retrieved from the database. The method may additionally include determining the retrieved attack feasibility ranking as an attack feasibility ranking included in information about the attack path depending on the threat scenarios.

According to an embodiment, the method may further include outputting the security goal through an output device, when the security goal is derived.

BRIEF DESCRIPTION OF THE DRAWINGS

The above and other objects, features, and advantages of the present disclosure should be more apparent from the following detailed description taken in conjunction with the accompanying drawings, in which.

DETAILED DESCRIPTION

Hereinafter, embodiments of the present disclosure are described in detail with reference to accompanying drawings. In adding the reference numerals to the components of each drawing, it should be noted that the identical or equivalent components are designated by the identical numerals even when the components are displayed on different drawings. In addition, in the following description of, a detailed description of well-known features or functions has been omitted where it was determined that the detailed description would unnecessarily obscure the gist of the present disclosure.

In describing the components of the embodiments according to the present disclosure, terms such as first, second, "A", "B", "(a)", "(b)", and the like may be used. These terms are merely intended to distinguish one component from another component. The terms do not limit the nature, sequence, or order of the constituent components. Unless otherwise defined, all terms used herein, including technical or scientific terms, have the same or equivalent meanings as those generally understood by those having ordinary skill in the art to which the present disclosure pertains. Such terms as those defined in a generally used dictionary should be interpreted as having meanings that are consistent with their meanings in the relevant field of art. The terms should not be interpreted as having ideal or excessively formal meanings unless clearly defined as having such in the present disclosure.

When a component, device, element, or the like of the present disclosure is described as having a purpose or performing an operation, function, or the like, the component, device, or element should be considered herein as being "configured to" meet that purpose or perform that operation or function.

Figure 1:
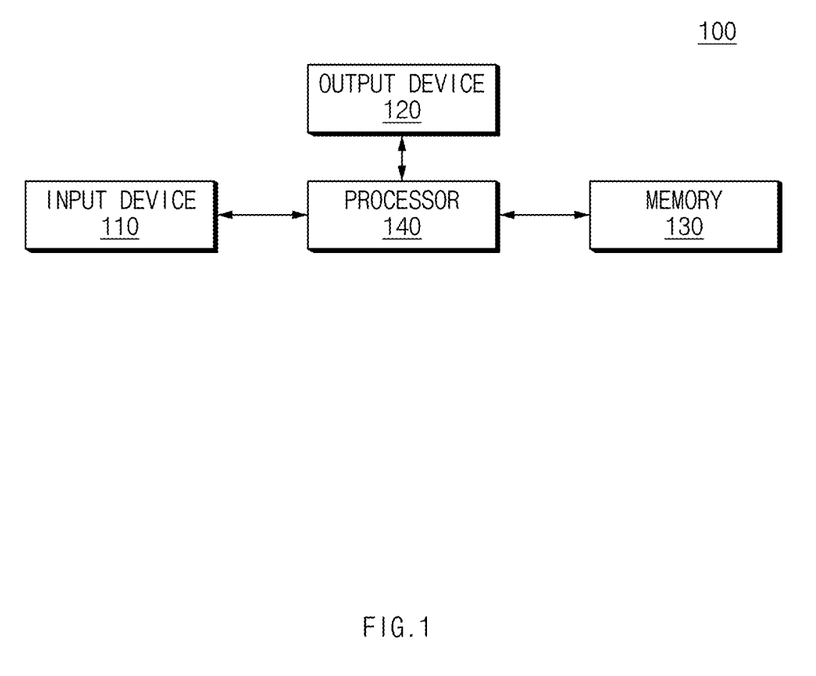
FIG. 1 is a block diagram illustrating an example configuration of an apparatus for performing threat analysis and risk assessment (TARA), according to an embodiment of the present disclosure.

FIG. 1 is a block diagram illustrating a configuration of an apparatus for performing threat analysis and risk assessment (TARA), according to an embodiment of the present disclosure.

As illustrated in FIG. 1, the apparatus 100 for performing the TARA may include an input device 110, an output device 120, a memory 130, and a processor 140.

The input device 110 may receive an input corresponding to a touch, a motion, or a voice of a user (a vehicle designer) and may transmit the input to the processor 140. The processor 140 may control the operation of the apparatus for performing TARA, based on the input information. According to an embodiment, the input device 110 may include a touch-type input device or a mechanical input device. For example, the input device 110 may include a touch screen, and/or may include a keyboard having characters or numbers arranged thereon.

The output device 120 may output a processing result (determination result) in the form of an image and/or a sound under the control of the processor 140. According to an embodiment, the output device 120 may be implemented in the form of a display device and/or a sound output device. The display device may include a head up display (HUD) or cluster. According to an embodiment, the display device may be implemented with a display that employs a liquid crystal display (LCD) panel, a light emitting diode (LED) panel, an organic light emitting diode (OLED) panel, or a plasma display panel (PDP). The liquid crystal display may include a thin film transistor liquid crystal display (TFT-LCD). The display device may be integrally implemented with the input device 110 through a touch screen panel (TSP).

The memory 130 may store at least one algorithm to compute or execute various instructions for the operation of the apparatus 100 for performing TARA according to an embodiment of the present disclosure. According to an embodiment, the memory 130 may store at least one instruction executed by the processor 140, and the at least one instruction may allow the apparatus for performing the TARA to operate according to an embodiment. The memory 130 may include at least one storage medium of at least one a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, or an optical disc.

According to an embodiment, the memory 130 may include a database (e.g., Threat Taxonomy Database). According to an embodiment, the database may include a threat scenario database (DB) for threat scenarios corresponding to multiple (e.g., all) damage scenarios, each threat scenario DB (including an attack scenario and a threat identification) for each attack path DB depending threat scenarios, a threat mitigation information DB linked to each threat DB, and an attack feasibility ranking DB for each attack path DB. The threat mitigation information may include at least one of an identification (ID) number for threat mitigation, a condition matched with the identification (ID) number for threat mitigation, an instruction (a condition for mitigating the threat, an instruction for mitigating the threat), or any one combination thereof.

According to an embodiment, the database may include asset-related information (including a function, an asset, an asset type, a security property, and detailed information (Detail) of the asset type), information about a threat type (Spoofing, Tampering, Repudiation, Information disclosure, Denial of Service, Elevation of privilege, STRIDE), information relation to an attack surface, and/or information (target ECU Information) about a target controller requiring security.

The processor 140 may be implemented by various processing devices, such as a microprocessor embedded therein with a semiconductor chip to operate or execute various instructions, and may control the apparatus for performing TARA according to an embodiment. The processor 140 may be electrically connected to the input device 110, the output device 120, and the memory 130 through a wired cable or various circuits to transmit an electrical signal including a control command to execute an arithmetic operation or data processing related to a control operation and/or communication. The processor 140 may include at least one of a central processing unit, an application processor, a communication processor (CP), or any one combination thereof.

The processor 140 may generate a threat scenario based on information about a specific damage scenario, when the specific damage scenario requiring threat analysis is selected through the input device 110. The processor 140 may determine each threat for each attack path depending on the threat scenarios based on a pre-stored database. Threat mitigation information (Mitigation) and an attack feasibility rating linked to each treat may be determined, and the security goal may be derived based on the threat mitigation information.

According to an embodiment, when the user selects the damage scenario generated when the security property to be protected for each asset is damaged, the threat scenario may be generated based on the asset-related information for the specific damage scenario selected by the user. The details thereof, according to an embodiment, are described below with reference to FIG. 2.

Figure 2:
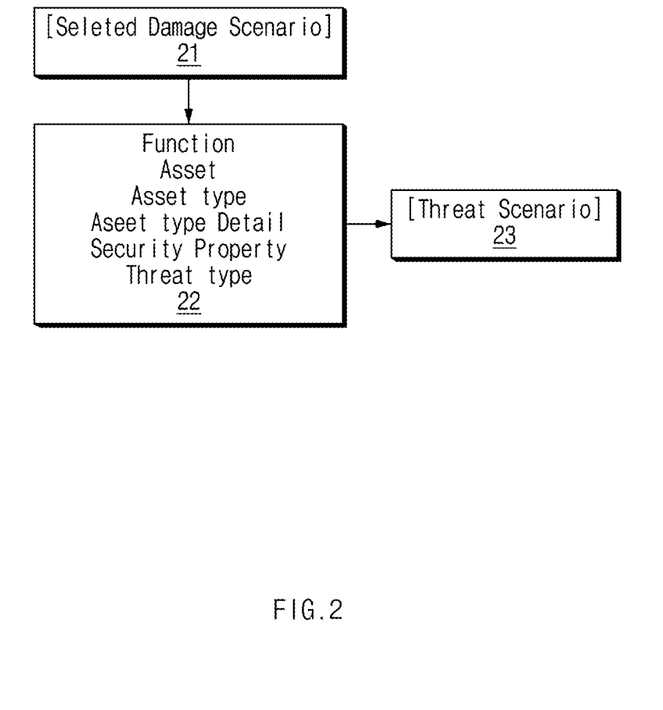
FIG. 2 is a diagram schematically illustrating the operation for generating a threat scenario, according to an embodiment of the present disclosure.

FIG. 2 is a diagram schematically illustrating the operation for generating a threat scenario, according to an embodiment of the present disclosure.

As illustrated in FIG. 2, the processor 140 may generate a threat scenario 23 based on asset-related information 22 for a damage scenario 21 selected by the user. According to an embodiment, the database included in the memory 130 may pre-store the asset-related information for each damage scenario with respect to all damage scenarios. When the specific damage scenario 21 is selected by the user, the processor 140 may acquire the asset-related information 22 corresponding to the damage scenario 21 selected from the asset-related information stored in the database. The processor 140 may generate the threat scenario 23 based on the asset-related information 22 retrieved from the database.

According to an embodiment, the asset-related information 22 retrieved from the database may include a function (Function) of an item (Item) to be secured, an asset (Asset) including data used to perform the function, an asset type (Asset type), detailed information (Detail) of the asset type, a cybersecurity property (Security Property), and a threat type (Threat Type).

The processor 140 may extract demand information about the threat scenario to determine information about the attack path depending on the threat scenario. The details thereof, according to an embodiment, are described below with reference to FIG. 3.

Figure 3:
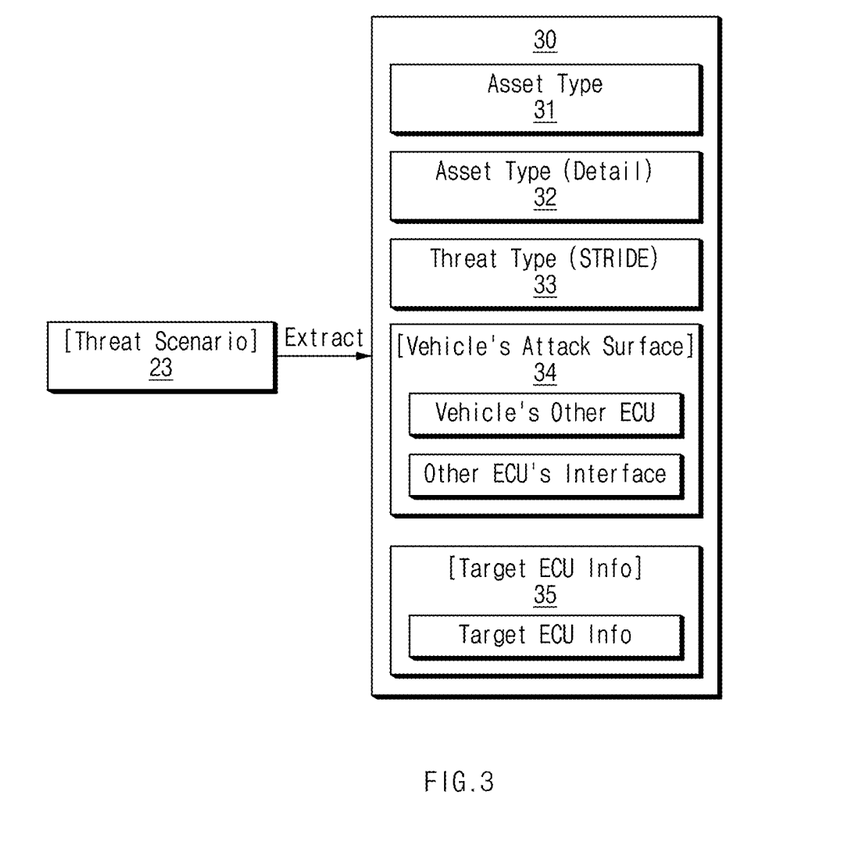
FIG. 3 is a diagram schematically illustrating an operation for extracting demand information for determining information about an attack path depending on a threat scenario according to an embodiment of the present disclosure.

FIG. 3 is a diagram schematically illustrating an operation for extracting demand information for determining information about an attack path depending on a threat scenario, according to an embodiment of the present disclosure.

As illustrated in FIG. 3, the processor 140 may extract the demand information 30 including an asset type 31 related to the threat scenario 23, detailed information 32 about the asset type, a threat type (STRIDE) 33, information 34 about an attack surface (Vehicle's Attack Surface), and demand information 30 including information (target ECU Information) about a target controller 35.

According to an embodiment, the asset type 31 may include a scheme of transmitting or receiving data. For example, the asset type may include CAN Communication Data, Ethernet Communication Data, Wi-Fi Communication Data, Bluetooth Communication Data, PnC Communication Data, Cellular Communication Data, NFC Communication Data, RF/LF signal Data, GPS signal Data, DAB/RADIO/RDS signal Data, V2V communication Data, Stored Data in External Storage, Stored Data in ECU system, Stored Data in EEPROM, or Firmware File.

According to an embodiment, the detailed information 32 of the asset type may include data transmitted or received through the asset type. For example, when the asset type is CAN communication data, the detailed information of the asset type may include data (e.g., camera sensor data or Lidar data) transmitted or received through CAN communication.

According to an embodiment, the threat type 33 may include six types classified from the treat. For example, the threat type 33 may include spooling, Tampering, Repudiation, Information Disclosure, or Elevation of privilege (STRIDE).

According to an embodiment, the vehicle's attack surface may include a target interface for cyber-attacking the controller. For example, the attack surface may include internal communication of the vehicle, a data transferring unit, or external communication ((Wi-fi, Bluetooth, LF/RF Communication, RFID (NFC), V2V, PnC, Cellular, Radio, or GPS)) of a vehicle. According to an embodiment, the information 34 about the attack surface may include a controller (Vehicle' Other ECU) making the external communication of the vehicle and an external communication list (Other ECU's interface) of the vehicle. As described above, since the demand information includes information about the attack surface, the processor 140 may provide information about the type of a vehicle and the attack path optimized for the controller included in the vehicle from the threat scenario.

According to an embodiment, the target controller information 35 may include detailed information of a controller to be secured. For example, the detailed information of the target controller may include a communication interface of data transmitted and received by the target controller and an update interface of the target controller.

When the demand information 30 about the threat scenario 23 is the processor 140 may search for demand information in the database and may extract information about an attack path corresponding to the searched demand information from the database. The details thereof, according to an embodiment, are described below with reference to FIG. 4.

Figure 4:
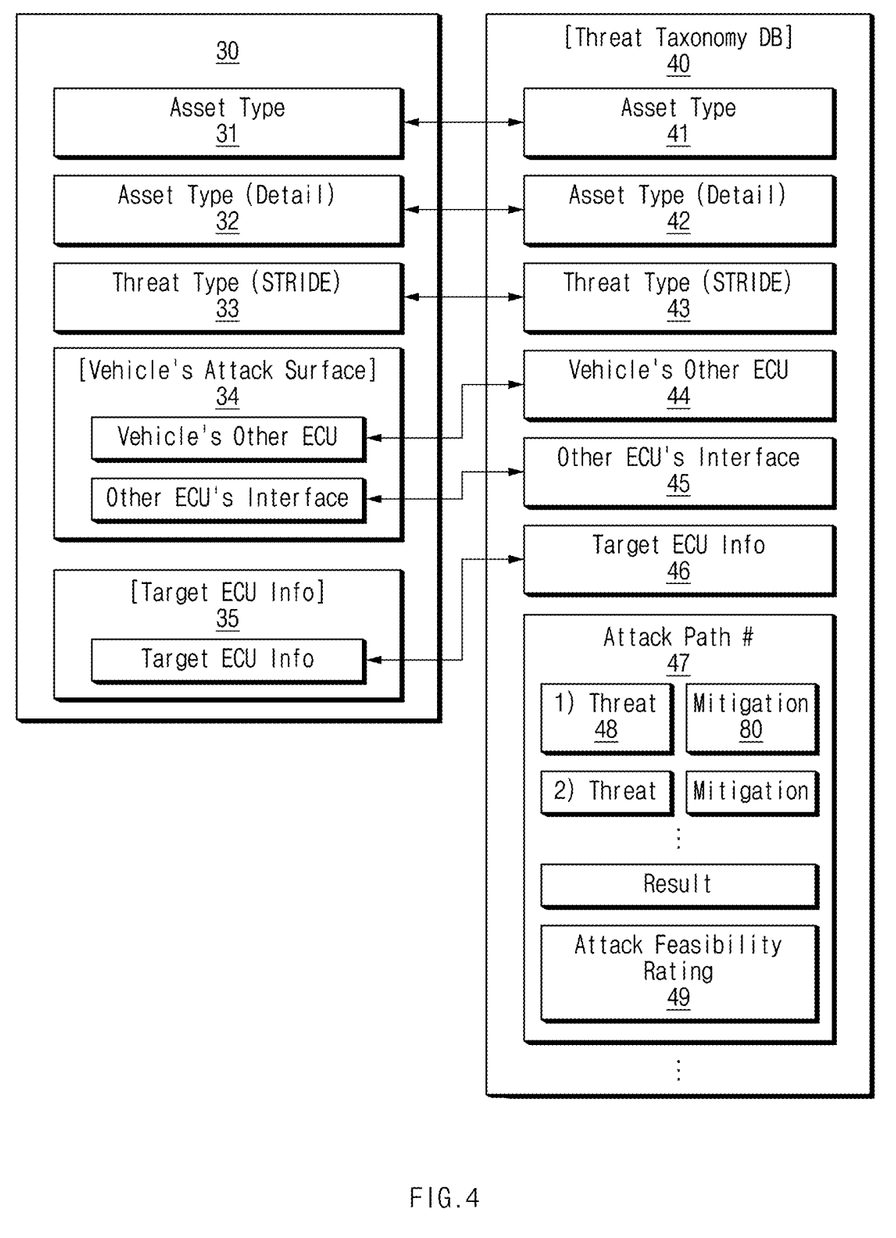
FIG. 4 is a diagram schematically illustrating the operation for retrieving the attack path corresponding to demand information, from a database, according to an embodiment of the present disclosure.

FIG. 4 is a diagram schematically illustrating an operation for retrieving, from a database, information about an attack path corresponding to demand information, according to an embodiment of the present disclosure.

As illustrated in FIG. 4, the processor 140 may match the demand information about the threat scenario with information stored in the database 40, to retrieve the demand information about the threat scenario from the database.

According to an embodiment, the processor 140 may match the asset type 31 included in the demand information 30 with the asset type 41 stored in the database 40.

According to an embodiment, the processor 140 may match the detailed information 32 of the asset type included in the demand information 30 with the detailed information 42 of the asset type stored in the database 40.

According to an embodiment, the processor 140 may match the information 34 about the attack surface included in the demand information 30 with the information 44 and 45 about the attack surface stored in the database.

According to an embodiment, the processor 140 may match the target controller information 35 included in the demand information 30 with target controller information 46 stored in the database 40.

According to an embodiment, when the demand information 30 is matched with the information in the database 40, the processor 140 may determine that the demand information 30 about the threat scenario is retrieved in the database 40. The processor 140 may also extract the information 47 about the attack path corresponding to the retrieved demand information from the database.

According to an embodiment, the information about the attack path may include a threat 48 and an attack feasibility rating 49 for the attack. According to an embodiment, a threat for each attack path may include an intentional operation for realizing a threat scenario.

According to an embodiment, a threat 48 for each attack path including threat information and a threat identification number may be stored in the database 40, Threat mitigation information 50 linked to the threat 48 may be stored together. According to an embodiment, the threat mitigation information 50 may include a threat mitigation identification number, a condition matched with the threat mitigation identification number, and a command (a condition to mitigate the threat, a command to mitigate the threat).

The processor 140 may determine information about the attack path depending on the threat scenario. The details thereof, according to an embodiment, are described below with reference to FIG. 5.

Figure 5:
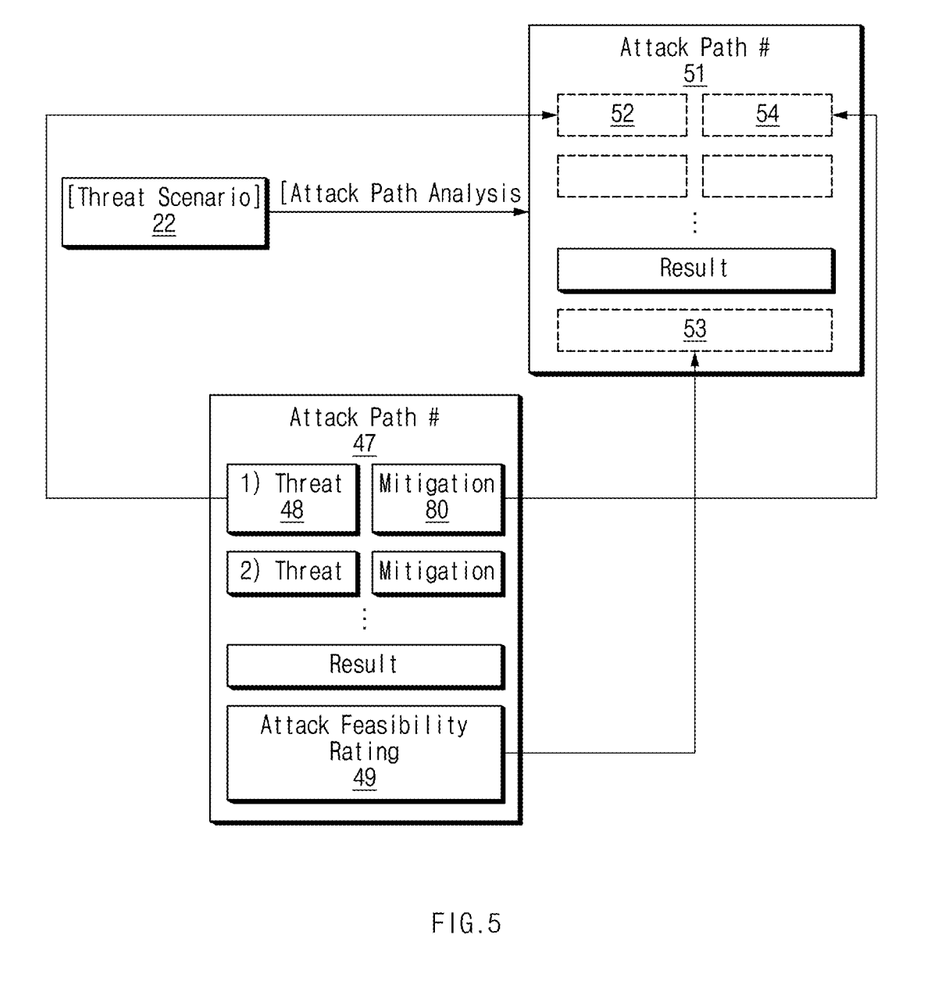
FIG. 5 is a diagram schematically illustrating the operation for determining information about an attack path depending on a threat scenario related to a specific damage scenario, according to an embodiment of the present disclosure.

FIG. 5 is a diagram schematically illustrating an operation of determining information about an attack path depending on a threat scenario related to a specific damage scenario, according to an embodiment of the present disclosure.

As illustrated in FIG. 5, the processor 140 may determine information 51 about the attack path by analyzing the attack path depending on the threat scenario 22. According to an embodiment, the processor 140 may determine information 51 about the attack path depending on the threat scenario 22 based on information about the attack path corresponding to the demand information retrieved from the database.

According to an embodiment, the processor 140 may extract, from the database, threat mitigation information 48 that is linked to each threat corresponding to the demand information retrieved from the database. The processor 140 may determine each threat 48 for each extracted attack path as each threat 52 for each attack path depending on the threat scenario 22.

According to an embodiment, the processor 140 may extract threat mitigation information 50 linked to each threat corresponding to the demand information retrieved in the database, from the database. The processor 140 may determine threat mitigation information 50 linked to each threat extracted, as the threat mitigation information 54 linked to the threat depending on the threat scenario 22.

According to an embodiment, the processor 140 may extract, from the database, attack the feasibility ranking 49 corresponding to the demand information retrieved from the data. The processor 140 may determine the extracted attack feasibility ranking 49 as the attack feasibility ranking 53 depending on the threat scenario 22.

When information about the attack path depending on the threat scenario 22 is determined, the processor 140 may derive a security goal based on the information about the attack path depending on the threat scenario 22. The details thereof, according to an embodiment, are described below with reference to FIG. 6.

Figure 6:
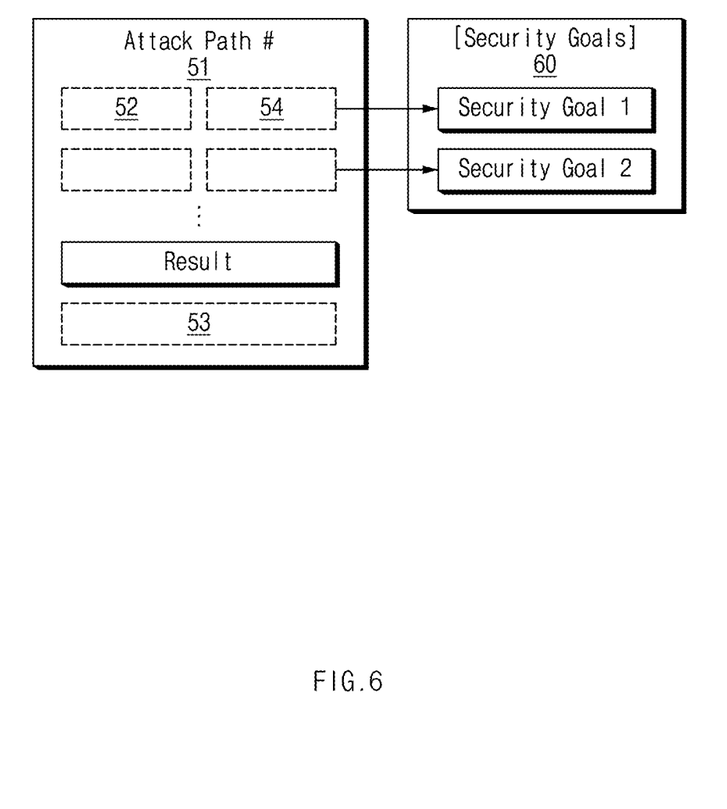
FIG. 6 is a diagram schematically illustrating the operation for deriving a security goal, according to an embodiment of the present disclosure.

FIG. 6 is a diagram schematically illustrating the operation for deriving a security goal according to an embodiment of the present disclosure.

As illustrated in FIG. 6, the processor 140 may derive a security goal 60 based on the threat mitigation information 54 linked to the threat 52 included in the information about the attack path depending on the threat scenario 22.

The processor 140 may output the derived security goal through the output device 120, when the security goal is derived.

Figure 7:
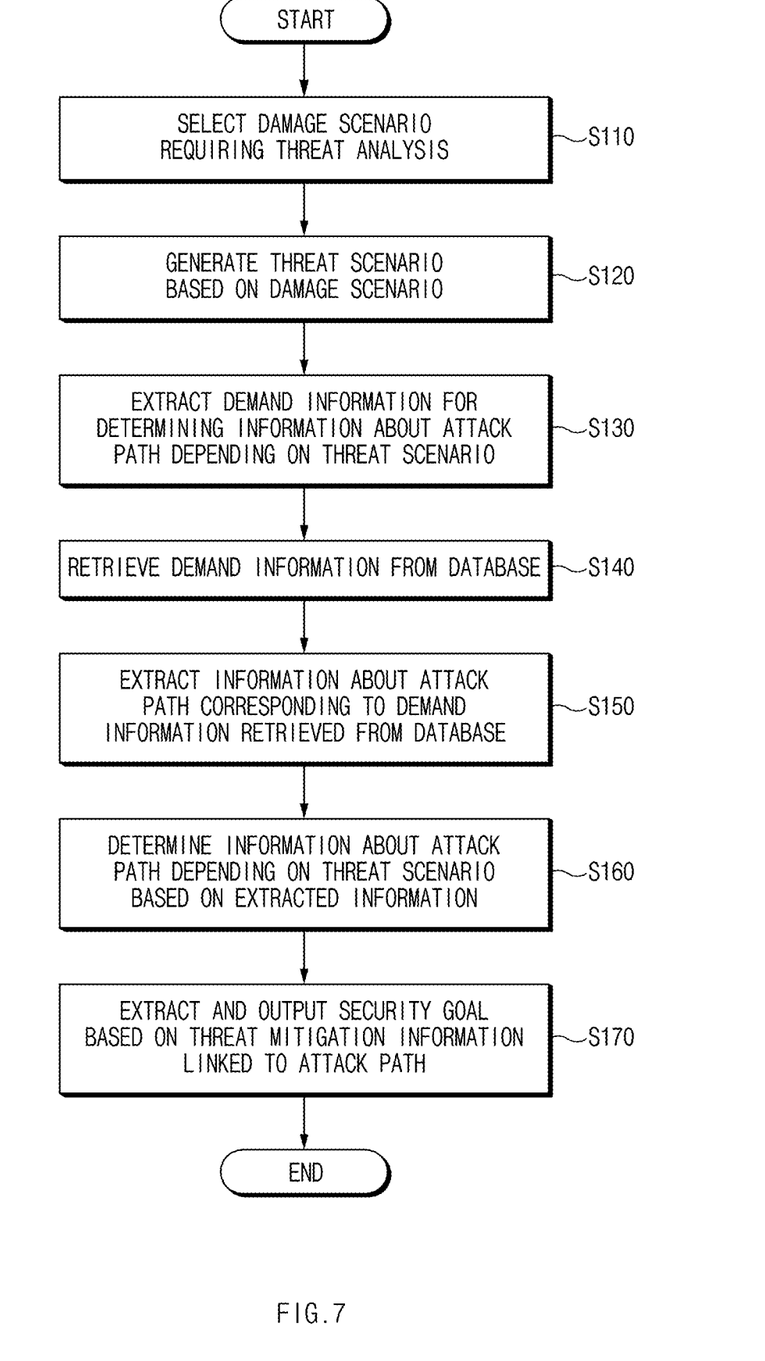
FIG. 7 is a flowchart illustrating a method for performing TARA, according to an embodiment of the present disclosure.

FIG. 7 is a flowchart of a method for performing TARA, according to an embodiment of the present disclosure.

As illustrated in FIG. 7, in an operation S110, the processor 140 may determine that a specific damage scenario to be caused in a vehicle is selected through the input device 110.

According to an embodiment, the processor 140 may determine that the specific damage scenario to be caused is selected, based on a user input through the input device 110, when a security property to be protected for each asset is damaged.

In an operation S120, when the specific damage scenario is selected, the processor 140 may generate the threat scenario based on information about the asset for the specific damage scenario.

In the operation S120, according to an embodiment, the database included in the memory 130 may pre-store the asset-related information for each damage scenario with respect to all damage scenarios. When the specific damage scenario 21 is selected by the user, the processor 140 may acquire the asset-related information 22 corresponding to the damage scenario 21 selected from the asset-related information stored in the database. The processor 140 may generate the threat scenario 23 based on the asset-related information 22 retrieved from the database.

According to an embodiment, the asset-related information 22 retrieved from the database may include a function of an item to be secured, an asset including data used to perform the function, an asset type, detailed information (Detail) of the asset type, a cybersecurity property, and a threat type.

In an operation S130, the processor 140 may extract demand information about the threat scenario to determine information about the attack path depending on the threat scenario.

In the operation 130, according to an embodiment, the processor 140 may extract the demand information 30 including an asset type 31 related to the threat scenario 23, detailed information 32 of the asset type, a threat type 33, information 34 about an attack surface (Vehicle's Attack Surface), and information (target ECU Information) about a target controller 35.

According to an embodiment, the asset type 31 may include a scheme of transmitting or receiving data. For example, the asset type may include CAN Communication Data, Ethernet Communication Data, Wi-Fi Communication Data, Bluetooth Communication Data, PnC Communication Data, Cellular Communication Data, NFC Communication Data, RF/LF signal Data, GPS signal Data, DAB/RADIO/RDS signal Data, V2V communication Data, Stored Data in External Storage, Stored Data in ECU system, Stored Data in EEPROM, or Firmware File.

According to an embodiment, the detailed information 32 of the asset type may include data transmitted or received through the asset type. For example, when the asset type is CAN communication data, the detailed information of the asset type may include data (camera sensor data or Lidar data) transmitted or received through CAN communication.

According to an embodiment, the threat type 33 may include six types classified from the treat. For example, the threat type 33 may include spooling, Tampering, Repudiation, Information Disclosure, or Elevation of privilege (STRIDE).

According to an embodiment, the vehicle's attack surface may include a target interface for cyber-attacking the controller. For example, the attack surface may include internal communication of the vehicle, a data transferring unit, or external communication ((Wi-fi, Bluetooth, LF/RF Communication, RFID (NFC), V2V, PnC, Cellular, Radio, or GPS)) of the vehicle. According to an embodiment, the information 34 about the attack surface may include a controller (Vehicle' Other ECU) making external communication of the vehicle and external communication list (Other ECU's interface) of the vehicle. As described above, since the demand information includes information about the attack surface, the processor 140 may provide information about the type of a vehicle and the attack path optimized for the controller included in the vehicle from the threat scenario.

According to an embodiment, the target controller information 35 may include detailed information of a controller to be secured. For example, the detailed information of the target controller may include a communication interface of data transmitted and received by the target controller and an update interface of the target controller.

In an operation S140, the processor 140 may retrieve the demand information in the database, when the demand information 30 about the threat scenario 23 is extracted.

In the operation S140, according to an embodiment, the processor 140 may match the demand information about the threat scenario with information stored in the database 40, to retrieve the demand information about the threat scenario from the database.

According to an embodiment, the processor 140 may match the asset type 31 included in the demand information 30 with the asset type 41 stored in the database 40.

According to an embodiment, the processor 140 may match the detailed information 32 of the asset type included in the demand information 30 with the detailed information 42 of the asset type stored in the database 40.

According to an embodiment, the processor 140 may match the information 34 about the attack surface included in the demand information 30 with the information 44 and 45 about the attack surface stored in the database.

According to an embodiment, the processor 140 may match the target controller information 35 included in the demand information 30 with target controller information 46 stored in the database 40.

According to an embodiment, when the demand information 30 is matched with the information in the database 40, the processor 140 may determine that the demand information 30 about the threat scenario is retrieved in the database 40.

In an operation S150, the processor 140 may extract the information 47 about the attack path corresponding to the retrieved demand information from the database.

In the operation S150, according to an embodiment, the information about the attack path may include a threat 48 and an attack feasibility rating 49 for the attack. According to an embodiment, a threat for each attack path may include an intentional operation for realizing a threat scenario.

According to an embodiment, a threat 48 for each attack path including threat information and a threat identification number may be stored in the database 40. Threat mitigation information 50 linked to the threat 48 may be stored in the database together. According to an embodiment, the threat mitigation information 50 may include a threat mitigation identification number, a condition matched with the threat mitigation identification number, and a command (a condition to mitigate the threat, a command to mitigate the threat).

In an operation S160, the processor 140 may determine information about the attack path depending on the threat scenario.

In the operation S160, the processor 140 may determine information 51 about the attack path by analyzing the attack path depending on the threat scenario 22. According to an embodiment, the processor 140 may determine information 51 about the attack path depending on the threat scenario 22, based on information about the attack path corresponding to the demand information retrieved from the database.

According to an embodiment, the processor 140 may extract threat mitigation information 48 that is linked to each threat corresponding to the demand information retrieved from the database, from the database. The processor 140 may determine each threat 48 for each extracted attack path as each threat 52 for each attack path depending on the threat scenario 22.

According to an embodiment, the processor 140 may extract, from the database, threat mitigation information 50 linked to each threat corresponding to the demand information retrieved in the database. The processor 140 may determine threat mitigation information 50 linked to each threat extracted, as the threat mitigation information 54 linked to the threat depending on the threat scenario 22.

According to an embodiment, the processor 140 may extract, from the database, the attack feasibility ranking 49 corresponding to the demand information retrieved from the data, and may determine the extracted attack feasibility ranking 49 as the attack feasibility ranking 53 depending on the threat scenario 22.

When information about the attack path depending on the threat scenario 22 is determined, the processor 140 may derive a security goal based on the information about the attack path depending on the threat scenario 22.

In an operation S170, according to an embodiment, the processor 140 may derive a security goal 60 based on the threat mitigation information 54 linked to the threat 52 included in the information about the attack path depending on the threat scenario 22. The processor 140 may output the derived security goal through the output device 120, when the security goal is derived.

Figure 8:
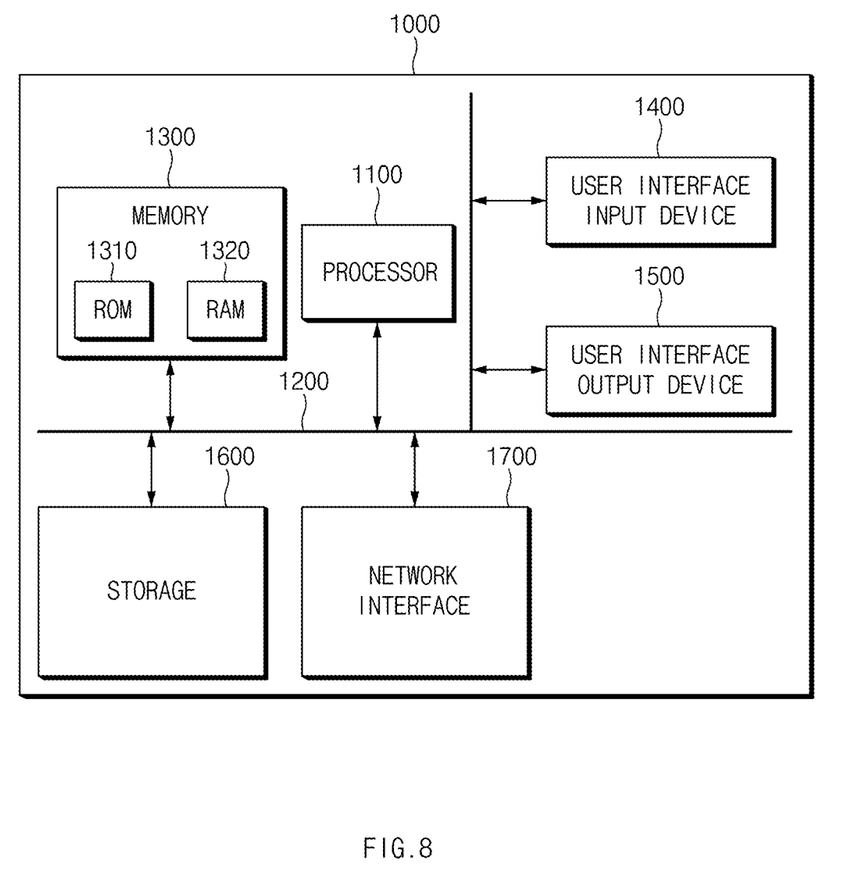
FIG. 8 is a block diagram illustrating the configuration of a computing system that may execute a method according to an embodiment of the present disclosure.

FIG. 8 is a block diagram illustrating a configuration of a computing system that may execute a method according to an embodiment of the present disclosure.

As illustrated in FIG. 8, a computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments of the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the apparatus for performing TARA and the method for the same, the optimal attack path may be determined based on the information about the vehicle and the information about the target controller requiring security, and the security goal may be derived corresponding to each threat with respect to each attack path, when deriving the security goal.

According to an embodiment of the present disclosure, in the apparatus for performing TARA and the method for the same, the threat scenario may be generated based on information about the specific damage scenario, when the specific damage scenario is selected, the information about the attack path may be determined depending on the threat scenario based on the pre-stored database, and the security goal may be derived based on the information about the attack path, thereby saving costs and time required to remove the attack path irrelevant to the type of the vehicle and the controller which is a target of the security.

The above description is merely illustrative of the technical idea of the present disclosure, and various modifications and alterations may be made by one having ordinary skill in the art without departing from the scope of the present disclosure.

Therefore, the described embodiments of the present disclosure are provided to explain the spirit and scope of the present disclosure, but not to limit them. The spirit and scope of the present disclosure are not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

What is claimed is:

1. An apparatus for performing threat analysis and risk assessment (TARA), the apparatus comprising:
    an input device configured to receive an input of a user; and
    a processor configured to
        generate a threat scenario based on information about a specific damage scenario, when a specific damage scenario requiring threat analysis is selected through the input device,
        determine information about an attack path depending on the threat scenario based on a pre-stored database, wherein the pre-stored database includes detailed information about asset types for multiple damage scenarios, information about an attack surface, information about a target controller that requires security, information about a threat scenario database (DB) for multiple damage scenarios, a threat DB for each attack path DB depending on the threat scenario DB, threat mitigation information DB linked to the threat DB, and an attack feasibility rating DB, and
        derive a security goal based on the information about the attack path.

2. The apparatus of claim 1, wherein the pre-stored database includes asset-related information including a function, an asset, an asset type, a security property, and a threat type for multiple damage scenarios.

3. The apparatus of claim 1, wherein the processor is configured to extract demand information about the threat scenario to determine the attack path.

4. The apparatus of claim 3, wherein the processor is configured to extract the demand information including detailed information about an asset type related to the threat scenario, information about an attack surface, and information about a target controller.

5. The apparatus of claim 3, wherein the processor is configured to retrieve the demand information from the pre-stored database.

6. The apparatus of claim 5, wherein the processor is configured to:
    extract, from the pre-stored database, a threat for each attack path corresponding to the demand information retrieved from the pre-stored database; and
    determine the extracted threat for each attack path as a threat for each attack path included in the information about the attack path depending on the threat scenario.

7. The apparatus of claim 5, wherein the processor is configured to:
    retrieve, from the pre-stored database, threat mitigation information linked to a threat corresponding to the demand information retrieved from the pre-stored database; and
    determine the threat mitigation information linked to the retrieved threat, as threat mitigation information linked to a threat included in the information about the attack path depending on the threat scenarios.

8. The apparatus of claim 5, wherein the processor is configured to:
    retrieve, from the pre-stored database, an attack feasibility ranking corresponding to the demand information retrieved from the pre-stored database; and
    determine the attack feasibility ranking as an attack feasibility ranking included in information about the attack path depending on the threat scenarios.

9. The apparatus of claim 1, wherein the processor is configured to output the security goal through an output device, when the security goal is derived.

10. A method for performing threat analysis and risk assessment (TARA), the method comprising:
    determining a specific damage scenario requiring threat analysis as being selected, through an input device, by a user;
    generating a threat scenario based on information about the specific damage scenario;
    determining information about an attack path depending on the threat scenario based on a pre- stored database, wherein the pre-stored database includes detailed information of asset types for multiple damage scenarios, information about an attack surface, information about a target controller that requires security, information about a threat scenario database (DB) for multiple damage scenarios, a threat DB for each attack path DB depending on the threat scenario DB, threat mitigation information DB linked to the threat DB, and an attack feasibility rating DB; and
    deriving a security goal based on information about the attack path.

11. The method of claim 10, wherein the pre-stored database includes asset-related information including a function, an asset, an asset type, a security property, and a threat type for multiple damage scenarios.

12. The method of claim 10, further comprising extracting demand information about the threat scenario to determine the attack path.

13. The method of claim 12, further comprising extracting demand information including an asset type related to the threat scenario, detailed information of the asset type, a threat type, information about an attack surface, and target controller information.

14. The method of claim 12, further comprising retrieving the demand information from the pre-stored database.

15. The method of claim 14, further comprising:
    extracting, from the pre-stored database, a threat for each attack path corresponding to the demand information retrieved from the pre-stored database; and
    determining the extracted threat for each attack path as a threat for each attack path included in the information about the attack path depending on the threat scenario.

16. The method of claim 14, further comprising:
    retrieving, from the pre-stored database, threat mitigation information linked to a threat corresponding to the demand information retrieved from the pre-stored database; and
    determining the threat mitigation information linked to the retrieved threat, as threat mitigation information linked to a threat included in the information about the attack path depending on the threat scenarios.

17. The method of claim 14, further comprising:
    retrieving, from the pre-stored database, an attack feasibility ranking corresponding to the demand information retrieved from the pre-stored database; and determining the attack feasibility ranking as an attack feasibility ranking included in information about the attack path depending on the threat scenarios.

18. The method of claim 10, further comprising outputting the security goal through an output device, when the security goal is derived.

* * * * *